United States Patent [19]

Chang

[11] Patent Number: 5,104,922

[45] Date of Patent: Apr. 14, 1992

[54] STABLE AQUEOUS ALUMINUM FLAKE DISPERSION

[75] Inventor: David C. K. Chang, Birmingham, Mich.

[73] Assignee: E. I. Du Pont de Nemours and Company, Wilmington, Del.

[21] Appl. No.: 606,077

[22] Filed: Oct. 22, 1990

[51] Int. Cl.$^5$ .......................... C08K 3/08; C08L 33/08
[52] U.S. Cl. .................................... 524/441; 524/440; 524/512; 524/558; 525/330.4; 525/329.8
[58] Field of Search .................. 526/330.4; 525/329.8; 524/440, 441, 512, 558

[56] References Cited

U.S. PATENT DOCUMENTS 4,822,685 4/1989 Perez et al. ...................... 428/423.3

Primary Examiner—Paul R. Michl
Assistant Examiner—Peter Szekely
Attorney, Agent, or Firm—Hilmar L. Fricke

[57] ABSTRACT

A stable waterborne high solids metallic flake pigment dispersion containing an aqueous carrier, film forming binder and metallic flake pigment and having a solids content of about 40-90% by weight; wherein the film forming polymer is a phosphated acrylic polymer neutralized with ammonia or a primary, secondary or tertiary amine and contains metallic flake pigments in a pigment to binder weight ratio of about 30/100-1000/100 and is non-reactive with the binder and the dispersion has a pH of about 7-9.

10 Claims, No Drawings

STABLE AQUEOUS ALUMINUM FLAKE DISPERSION

BACKGROUND OF THE INVENTION

This invention is related to a stable aqueous aluminum dispersion useful in waterborne coating compositions.

It is well known to add metallic flake pigments such as aluminim flake pigments into coating composition to provide the composition with metallic glamour. There are relatively few problems with the addition of these flakes into solvent based coating compositions but in waterborne compositions the aluminum flake tends to react with water and deteriorates the flake and can cause the evolution of gas. To avoid such problems, agents have been incorporated such as phosphate compound as shown in Backhouse et al U.S. Pat. No. 4,621,112, issued Nov. 4, 1986. Up until now, it has not been possible to directly formulate stable water based metallic flake dispersions that contain a relatively high solids level of metallic flake. The practice has been to formulate the metallic flake dispersion in a solvent base and then invert the dispersion into water. The direct formulation of a stable water based dispersion has not been accomplished.

This invention provides for the direct formulation of a stable waterbased high metallic solids dispersion that can be added directly to a waterborne coating composition or can be used to shade a waterborne coating composition to provide a desired color.

SUMMARY OF THE INVENTION

A stable waterborne high solids metallic flake pigment dispersion containing an aqueous medium, a binder of a film forming polymer and metallic flake pigment; wherein the film forming polymer is a phosphated acrylic polymer neutralized with ammonia or a primary, secondary or tertiary amine and optionally, contains a hydrophobic melamine resin and the metallic flake pigment is present in pigment to binder weight ratio of about 30/100–1000/100 and is non reactive with the binder.

DETAILED DESCRIPTION OF THE INVENTION

The waterborne metallic flake pigment dispersion is stable and can be added to waterbased coating compositions without deterioration of the pigment and generation of gas caused by a reaction of the flake with water or other constituents in the coating composition.

The dispersion has a solids content of about 10 to 60% by weight and contains about 1 to 50% of binder of film forming polymer.

The binder of a film forming polymer is a phosphated acrylic polymer neutralized with ammonia, a primary, a secondary or tertiary amine. The binder also can contain a hydrophobic melamine resin.

The acrylic polymer is prepared by a conventional solution polymerization process to form a solution of an acrylic polymer. In the solution polymerization process, monomers, catalyst such as azobisisobutyronitrile and solvent are charged into a reaction vessel and the polymerization is carried out under conventional temperatures of about 50–90° C. for about 1–5 hours. Typically, the acrylic polymer has weight average molecular weight of about 5,000–30,000.

Molecular weights are determined by gel permeation chromatography using polymethyl methacrylate as a standard.

The monomers used to form the acrylic polymer are alkyl acrylates, alkyl methacrylates each having 1–12 carbon atoms in the alkyl group, glycidyl methacrylate or glycidyl acrylate, hydroxy alkyl acrylates or methacrylates having 1–4 carbon atoms in the alkyl groups and optionally, an ethylenically unsaturated carboxylic acid. About 1–30% by weight of styrene also can be used in the polymer.

Typical alkyl acrylates and methacrylates that can be used are methyl acrylate, ethyl acrylate, propyl acrylate, isopropyl acrylate, butyl acrylate, isobutyl acrylate, pentyl acrylate, hexyl acrylate, octyl acrylate, nonyl acrylate, lauryl acrylate, methyl methacrylate, ethyl methacrylate, propyl methacrylate, butyl methacrylate, isobutyl methacrylate, hexyl methacrylate, octyl methacrylate, nonyl methacrylate, lauryl methacrylate and the like.

Typical hydroxy alkyl acrylates and methacrylates that can be used are hydroxy methyl acrylate, hydroxy ethyl acrylate, hydroxy propyl acrylate, hydroxy butyl acrylate, hydroxy methyl methacrylate, hydroxy ethyl methacrylate, hydroxy propyl methacrylate, hydroxy butyl methacrylate and the like.

Typical ethylenically unsaturated carboxylic acids that can be used are acrylic acid, methacrylic acid, itaconic acid, maleic acid and the like.

Preferably, the acrylic polymer contains polymerized monomers of an alkyl methacrylate having 1–4 carbon atoms in the alkyl group, a glycidyl acrylate or methacrylate, an alkyl acrylate having 2–8 carbon atoms in the alkyl group and a hydroxy alkyl acrylate or methacrylate having 2–4 carbon atoms in the alkyl group. The polymer also can contain up to 20% by weight styrene.

One particularly preferred acrylic polymer contains about 10–30% by weight butyl methacrylate, 5–20% by weight glycidyl methacrylate, 2–10% by weight butyl acrylate, 10–20% by weight ethyl methacrylate, 5–20% by weight hydroxyethyl acrylate and 5–20% by weight styrene.

The acrylic polymer then is phosphated by reacting the acrylic polymer with phosphoric acid in an equivalent ratio of about 1:1 phosphoric acid to hydroxyl groups on the polymer to form a phosphated acrylic polymer. Phosphoric acid in solution is blended with the acrylic polymer and reacted at about 50–80° C. for about 1–6 hours.

A hydrophobic, alkylated melamine formaldehyde crosslinking agent can be used in the binder. A blend of about 10–60% by weight, based on the weight of the binder, of the phosphated acrylic polymer and 40–90% by weight, based on the weight of the binder, of the hydrophobic alkylated melamine formaldehyde crosslinking agent can be used.

Typical monomeric and polymeric hydrophobic alkylated melamine formaldehyde crosslinking agents that can be used are partially or fully alkylated melamine formaldehyde resins, such as "Cymel" 300 resins. Particularly useful resins are partially or highly methylated melamine formaldehyde resins, mixed ether and butylated melamine formaldehyde resins and other partially or fully alkylated melamine formaldehyde resins having 1–6 carbon atoms in the alkyl group. One preferred resin is "Cymel" 350 which is a methylated melamine formaldehyde resin that has a methyoxymethylimino functionality. Another preferred resin is "Cymel" 300 which is a highly methylated melamine formaldehyde resin containing reactive alkoxy groups. Still another preferred resin is "Resimine" 755 which is a fully methylated and butylated melamine formaldehyde resin.

In formation of the dispersion, the phosphated acrylic resin, the optional melamine crosslinking agent, metallic flake pigments and other optional pigments, water and ammonia, primary, secondary or tertiary amine are thoroughly blended together using a conventional mixing vessel. Gassing of the metallic flake pigments or degradation of the flake pigments do not occur even after several weeks under ambient temperature conditions.

The pH of the dispersion is adjusted to about 7-10 with ammonia, a primary, secondary or tertiary amine. Typically useful primary amines are aminoethyl propanol, alkylamine, 1-amino-2-propanol, 3-amino-1-propanol, benzylamine, butylamine, sec. butylamine, tert. butylamine, cyclohexylamine, decylamine, dodecylamine, ethanolamine, ethylamine, 2-ethylhexylamine, heptylamine, hexylamine, isobutylamine, isopropylamine, methylamine, octylamine, pentylamine, propylamine, ethylene diamine and the like. Typically useful secondary amines are 2,2-dimethyl oxaolidine-1,4, 2,2-dimethanol oxazolidine-1,4, 2,2-diethyl oxazolidine-1,4, dibenzyl amine, dibutylamine, dicyclohexylamine, didodecylamine, diethanolamine, diethylamine, 2,2-diethylhexylamine, dihexylamine, diisopropanolamine, dimethylamine, dioctylamine, dipentylamine, dipropylamine, 2-ethyl amino ethanol, 2(2-hydroxyethylamino)-2-(hydroxymethyl)-1, 3-propanediol, 2-methyl aminoethanol, 2,(2-amino ethylamino) ethanol, 3,3 diamino-dipropylamine, diethylene triamine, N-methyl ethylene diamine and the like. Typically useful tertiary amines are triethyl amine, trimethyl amine, triphenyl amine and the like.

Typical metallic flake pigments that can be used are aluminum flake, bronze flake, nickle flake, stainless steel flake and the like. Aluminum flake is preferred since it imparts an automotive finish with the desired metallic glamour. Preferably, these pigments are present in a pigment to binder weight ratio of about 40/100-200/100.

Other pigments can be used in the dispersion such as metallic oxides such as titanium dioxide, zinc oxide, iron oxides of various colors, filler pigments such as barytes, talc, magnesium silicate, silica, colloidal silica, carbon black, organic pigments such phthalocyanine greens and blues, perylenes, azo pigments, indanthrone blues, carbazoles such as carbazole violet, isoinodolones, thioindigo reds, benzimidazolinones and the like. The pigments are formulated into a mill base using conventional procedures and then the mill base is blended with the metallic flake dispersion.

Thickeners and rheology control agents can be added to the metallic flake dispersion in amounts of about 0.5-5% by weight, based on the weight of the binder, to provide the desired spray viscosity and rheology. Typically, acrylic polymers such as polyacrylic acid, clays such "Bentones", cellulosics or urethanes can be added.

The metallic flake dispersion can be used in a conventional waterborne acrylic polymer coating composition used as a monocoat paint or in a waterborne base coat of a base coat/clear coat paint system currently used on many automobiles.

These waterborne paints may have as the film forming binder components acrylic polymers, acryloure- thane polymers, polyesters, polyester urethanes and may contain alkylated melamine formaldehyde crosslinking agents or isocyanate crosslinking agents which may be blocked or unblocked.

The substrates over which these paint compositions are applied are those conventionally used for automotive and truck bodies such as cold roll steel, phosphated steel, polyester reinforced fiber glass, reaction injection molded urethane, crystalline amorphous polyamides and the like. Typically, these substrates are coated with a pigmented layer of an alkyd resin primer, polyester primer, epoxy resin primer and the like.

The composition can be applied to a substrate by any of the conventional methods such as spraying, electrostatic spraying, dipping, brushing, flow coating and the like. The preferred method is spraying.

In the application of a base coat/clear coat paint system, the base coat of a waterborne paint is applied and is usually dried at ambient temperatures or at an elevated temperature of 30-100° C. for about 0.5-30 minutes to allow water and solvent to evaporate before the clear coating is applied. Generally, the basecoating is applied to provide a dry film thickness of about 0.2-2.0 mils in thickness.

A high solids solvent based clear coating composition is then applied to the base coating and dried. The clear coating composition typically has as the film forming binder about 50-97% by weight of either an acrylic polymer, a polyester or a polyesterurethane and 3-50% by weight of an alkylated melamine formaldehyde crosslinking agent. The composition also contains about 0.1-5% by weight of a strong acid catalyst such as sulfonic acid. The substrate coated with the basecoating and clear coating is then baked at about 100-180° C. for about 1-30 minutes to provide a glossy, wrinkle free finish with automotive quality appearance that is about 0.5-6.0 mils in thickness.

The following example illustrates the invention. All parts and percentages are on a weight basis. Molecular weights are weight average and determined by gel permeation chromatography.

EXAMPLE 1

An aluminum flake mill base was prepared by first forming a dispersion of a phosphated acrylic resin and then forming the mill base with this dispersion.

A solution of a phosphated acrylic resin was prepared as follows:

|  | Parts by Weight |
|---|---|
| Portion 1 | |
| Xylene | 798.0 |
| Portion 2 | |
| Styrene monomer | 266.0 |
| Butyl methacrylate monomer | 703.0 |
| Glycidyl methacrylate monomer | 213.0 |
| Butyl acrylate monomer | 116.0 |
| Ethyl methacrylate monomer | 266.0 |
| Hydroxy ethyl acrylate monomer | 174.0 |
| Portion 3 | |
| 2,2-(2-methyl butane nitrile) | 124.0 |
| Xylene | 332.0 |
| Butanol | 289.0 |
| Portion 4 | |
| 2,2-azobis-(2,4-dimethyl valeronitrile) | 9.2 |
| Xylene | 142.0 |
| Portion 5 | |
| Xylene | 68.0 |

|  | Parts by Weight |
|---|---|
| Total | 3500.2 |

Portion 1 was charged into a reactor equipped with a heat source and a stirrer and heated to its reflux temperature of about 138° C. Portions 2 and 3 were added at a uniform rate over a 90 minute period while maintaining the reaction mixture at its reflux temperature and held at its reflux temperature for an additional 90 minutes. Portion 4 was added at a uniform rate over a 60 minute period and then the reaction mixture was held at its reflux temperature for an additional 60 minutes and then Portion 5 was added. The resulting polymer solution had a 51.2% polymers solid content and a Gardner Holdt viscosity measured at 25° C. of A. The polymer had the following composition: 15.5% styrene, 20.45% butyl methacrylate, 12.27% glycidyl methacrylate, 6.65% butyl acrylate, 15.30% ethyl methacrylate, 10.0% hydroxy ethyl methacrylate.

The acrylic polymer was then reacted with phosphoric acid:

|  | Parts by Weight |
|---|---|
| Portion 1 | |
| Isopropanol | 300.0 |
| Phosphoric acid solution (85% solid in water) | 77.0 |
| Portion 2 | |
| Acrylic polymer solution (prepared above) | 2470.0 |
| Total | 2847.0 |

Portion 1 was charged into a reaction vessel and heated to 50° C. Portion 2 was added and the reaction mixture was held at 65-70° C. for 4 hours to form a phosphated acrylic polymer solution.

An aluminum flake mill base was prepared by blending together the following constituents:

|  | Parts by Weight |
|---|---|
| Portion 1 | |
| "Cymel" 350 (highly methylolated melamine formaldehyde resin having a degree of polymerization of about 1.6) | 732.0 |
| Ethylene glycol monobutyl ether | 425.0 |
| Amino 2-methyl-1-propanol | 14.0 |
| Portion 2 | |
| Phosphated acrylic polymer solution (prepared above) | 354.0 |
| Amino 2-methyl-1-propanol | 2.0 |
| Portion 3 | |
| Aluminum flake paste (65% solids aluminum flake in mineral spirits) | 948.0 |
| Portion 4 | |
| Deionized water | 93.2 |
| "Acrysol" ASE-60 Thickener (acrylic polymer emulsion of polyacrylic acid) | 10.8 |
| Amino 2-methyl-1-proponal | 4.0 |
| Portion 5 | |
| Water | 1070.0 |
| Total | 3653.0 |

Portion 1 was added to a mixing vessel and mixed together. Portion 2 was added with mixing and after all of Portion 2 was added mixing was continued an additional 10 minutes. Portion 3 was added with mixing and mixed an additional 20 minutes. Portion 4 was premixed and added with mixing and mixed an additional 5 minutes. Portion 5 was added with mixing and mixed an additional 10 minutes. The resulting mill base had a pH of 8.2 and an aluminum pigment to binder weight ratio of 71/100. No gassing or degradation of the aluminum flake pigment was noted even after several weeks of standing at ambient temperatures.

An acrylic latex was prepared by charging the following constituents into a polymerization vessel equipped with a stirrer and a heating source:

|  | Parts by Weight |
|---|---|
| Portion 1 | |
| Deionized water | 2535.0 |
| Anionic surfactant (Alkyl phenol ethylene oxide) | 16.4 |
| Portion 2 | |
| Anionic surfactant (described above) | 23.4 |
| Methyl methacrylate monomer | 369.0 |
| Butyl methacrylate monomer | 1622.4 |
| Deionized water | 2335.0 |
| Portion 3 | |
| Deionized water | 225.0 |
| Ammonium Persulfate | 7.0 |
| Portion 4 | |
| Deionized water | 1097.0 |
| Anionic surfactant (described above) | 11.7 |
| Methacrylic acid | 81.7 |
| Hydroxy ethyl acrylate monomer | 116.8 |
| Butyl acrylate monomer | 385.3 |
| Portion 5 | |
| Deionized water | 85.0 |
| Ammonium Persulfate | 2.3 |
| Portion 6 | |
| Deionized water | 451.0 |
| Amino methyl propanol | 60.7 |
| "Cosan" 145 - latex preservative of an oxazolidine derivative made by Cosan Chemical Corp. | 10.0 |
| Total | 9434.6 |

Portion 1 was charged into the polymerization vessel and heated to about 83° C. Portion 2 was premixed. About 10% of Portion 2 was added and the resulting reaction mixture was held at the above temperature. The remainder of Portion 2 was added over a 60 minute period along with about 72% of Portion 3 while controlling the reaction mixture at about 85° C. The remainder of Portion 3 along with Portion 4 was added over a 30 minute period while controlling the reaction mixture at 85° C. Portion 5 was added and the reaction mixture was held at 85° C. for 60 minutes. Portion 6 was added over a 30 minute period and held at the above temperature for about 1 hour. The resulting latex was cooled to room temperature and filtered.

The acrylic latex has a polymer solids content of 27.7% and a pH of 7.2. The polymer is comprised of 14.3% methyl methacrylate, 78.0% butyl acrylate, 3.2% methacrylic acid, and 4.5% hydroxy ethyl acrylate.

A waterborne basecoating composition was prepared by blending together the following constituents:

|  | Parts by Weight |
|---|---|
| Portion 1 | |
| Acrylic latex (prepared above) | 311.4 |
| Deionized water | 225.8 |

| | Parts by Weight |
|---|---|
| Amino-2-methyl-1-propanol | 2.3 |
| "Acrysol" ASE-60 (described above) | 13.6 |
| Portion 2 | |
| Aluminum mill base (prepared above) | 82.0 |
| Total | 635.1 |

The constituents of Portion 1 were added to a mixing vessel in the order shown with constant mixing during the addition and then mixed an additional 10 minutes. Portion 2 was added with mixing and mixed an additional 30 minutes. The resulting coating composition was stable for 30 days and did not gas nor did the aluminum flake settle out of the composition.

A high solids solvent based clear coating composition was prepared by blending together the following ingredients:

| | Parts by Weight |
|---|---|
| Siloxane solution (5% solids of oxyphenylene methyl siloxane in xylene) | 0.20 |
| Inhibitor solution (.05 parts "Irganox" 1010, .99 parts "Tinuvin" 900 and 8.87 parts xylene) | 9.90 |
| Xylene | 3.02 |
| Acrylic polymer solution (1.75 parts styrene/ methyl methacrylate/hydroxy ethyl acrylate polymer weight ratio 15/15/40/30, 0.83 parts methyl amyl ketone and 0.74 parts of film fortifier A-133D from Heubach) | 3.32 |
| Melamine resin solution (5.47 parts "Resimene" 755, 2.29 isopropanol, 2.29 parts methyl amyl ketone, 0.98 parts "Aerosil" 200 colloidal silica from Degussa) | 11.03 |
| "Resimene" 755 (fully methylated and butylated melamine formaldehyde resin) | 13.24 |
| Acrylic polymer solution 1 (20.47 parts of copolymer of butyl methacrylate/ hydroxy propyl acrylate weight ave MW 7000 8.77 parts xylene) | 29.25 |
| Acrylic polymer solution 2 (7.39 parts of polymer of styrene/ methyl methacrylate/butyl acrylate/hydroxy ethyl acrylate/acrylic acid in a weight ratio 29/21/32/17/1, 1.01 parts butyl acetate, 0.29 parts n-butanol, 1.97 parts ethylene glycol monoethyl ether acetate and 1.51 parts petroleum naphtha) | 12.18 |
| Methanol | 12.62 |
| N-propyl alcohol | 1.70 |
| PVP solution (0.13 parts polyvinyl pyrrolidone and 1.89 parts methanol) | 2.02 |
| Amine solution (0.06 parts n-propyl amine and 0.19 parts methanol) | 0.25 |
| N-butanol | 0.85 |
| Acid catalyst solution (0.29 parts dodecyl benzene sulfonic acid and 0.13 parts isopropanol) | 0.42 |
| Total | 100.00 |

The above prepared waterborne base coating composition was spray applied to a phosphatized steel panel; the panel had been coated with an electrodeposited epoxy ester electrocoating composition. Three coats of the basecoating were applied. After the application of each of the coats, the coating was held at room temperature for 10 minutes to allow solvent to flash from the coating and then the panels were baked for 10 minutes at about 83° C. The above prepared clear coating composition was reduced with xylene to a viscosity of 45" determined with a #2 Fischer cup. The clear coat was applied in two coats and was held at room temperature for 10 minutes to allow solvent to flash off and then baked for 30 minutes at 125° C. to provide a clear coating about 1.8-2.0 mils thick.

The results are shown below:
Basecoat film thickness—0.6 mils
Clear Coat film thickness—1.9 mils
Gloss (measured at 20°)—88
Distinctness of Image—86
Head on Brightness—127

Waterbased aluminum flake mill base made directly as a water dispersion with a phosphated acrylic resin and an alkylated melamine formaldehyde resin formed a mill base that does not evolve gas in storage nor do waterbased coatings evolve gas on standing made with such a mill base and resulting finishes made with the waterborne coating have acceptable automotive quality appearance.

EXAMPLE 2

An aluminum flake mill base was prepared by blending together the following constituents:

| | Parts by Weight |
|---|---|
| Portion 1 | |
| Water | 710.0 |
| Ethylene glycol monobutyl ether | 140.0 |
| Amino 2-methyl-1-propanol | 21.0 |
| Nonionic dispersant | 30.0 |
| Portion 2 | |
| Phosphated acrylic polymer solution (prepared in Example 1) | 354.0 |
| Portion 3 | |
| Aluminum flake paste (65% solids aluminum flake in mineral spirits) | 948.0 |
| Deionized water | 207.0 |
| Total | 2410.0 |

Portion 1 was added to a mixing vessel and the constituents were mixed together. Portion 2 was added with mixing and after all of Portion 2 was added mixing was continued an additional 10 minutes. Portion 3 was added with mixing and mixed an additional 30 minutes. The resulting mill base had a pH of 8.36. No gassing or degradation of the aluminum flake pigment was noted even after 30 days of standing at ambient temperatures.

A waterborne base coating composition was prepared identical to waterborne base coating composition of Example 1 except the above prepared mill base was used in the place of the aluminum mill base of Example 1. The resulting base coating composition was stable for 30 days and did not gas nor did the aluminum flake settle out of the composition.

The above waterborne base coating composition was spray applied to a phosphatized steel panel that had been electrocoated with an epoxy ester electrocoating composition using the same procedure and baking conditions as in Example 1 and the same clear coat was applied and baked as in Example 1. The resulting finish of the basecoat and clear coat had about the same properties of gloss, distinctness of image and head on brightness as in Example 1.

I claim:

1. A stable waterborne high solids metallic flake pigment dispersion useful for direct addition to a waterbased coating composition consisting essentially of an aqueous carrier, film forming binder and metallic flake pigment and having a solids content of about 10-60% by weight; wherein the film forming binder consists essentially of a blend of about 10-60% by weight, based on the weight of the binder, of a phosphated acrylic polymer neutralized with ammonia or a primary, a secondary or tertiary amine and 40-90% by weight, based on the weight of the binder, of a hydrophobic alkylated melamine formaldehyde crosslinking agent and contains metallic flake pigments in a pigment to binder weight ratio of about 30/100–1000/100 and is non-reactive with the binder and the dispersion has a pH of about 7-9 and wherein the phosphated acrylic polymer consists essentially of polymerized monomers of alkyl methacrylate or acrylate or mixtures thereof having 1–8 carbon atoms in the alkyl group, glycidyl methacrylate or acrylate, hydroxy alkyl methacrylate or acrylate having 1–4 carbon atoms in the alkyl group where the hydroxyl groups of the polymer have been reacted with phosphoric acid.

2. The dispersion of claim 1 containing colored pigments in addition to the metallic flake pigment.

3. The dispersion of claim 1 in which the acrylic polymer contains 1-30% by weight, based on the weight of the acrylic polymer, of styrene.

4. The dispersion of claim 3 in which the acrylic polymer consists essentially of polymerized monomers of styrene, butyl methacrylate, glycidyl methacrylate, butyl acrylate, ethyl methacrylate and hydroxy ethyl acrylate in which the hydroxyl groups of the polymer have been reacted with phosphoric acid.

5. The dispersion of claim 1 which has been neutralized with a primary amine.

6. The dispersion of claim 1 in which the alkylated melamine formaldehyde crosslinking agent is a highly methylated and contains alkoxy immino groups.

7. The dispersion of claim 1 in which the alkylated melamine formaldehyde crosslinking agent is a highly methylated and has a degree of polymerization of about 1.6.

8. The dispersion of claim 1 in which the alkylated melamine formaldehyde crosslinking agent is a fully methylated and butylated melamine formaldehyde resin.

9. The dispersion of claim 1 containing in addition an acrylic polymer thickening agent.

10. A coating composition of an acrylic polymer and a crosslinking agent and about 1–20% by weight, based on the weight of the coating composition of the dispersion of claim 1.

* * * * *